(12) United States Patent
Kinugasa et al.

(10) Patent No.: US 8,157,441 B2
(45) Date of Patent: Apr. 17, 2012

(54) TEMPERATURE SENSOR PROBE

(75) Inventors: Seiichiro Kinugasa, Tokyo (JP);
Atsushi Kato, Tokyo (JP)

(73) Assignee: Yamatake Corporation, Tokyo (JP)

( * ) Notice: Subject to any disclaimer, the term of this patent is extended or adjusted under 35 U.S.C. 154(b) by 576 days.

(21) Appl. No.: 12/274,480

(22) Filed: Nov. 20, 2008

(65) Prior Publication Data
US 2009/0135881 A1 May 28, 2009

(30) Foreign Application Priority Data

Nov. 22, 2007 (JP) ................................ 2007-302587

(51) Int. Cl.
*G01K 11/20* (2006.01)
*G01K 11/32* (2006.01)
*G01J 5/08* (2006.01)
(52) U.S. Cl. ......................... 374/161; 374/131; 374/120
(58) Field of Classification Search .................. 374/161, 374/162, 141, 120, 121, 130, 131, 132, E11.018; 356/43; 116/216
See application file for complete search history.

(56) References Cited

U.S. PATENT DOCUMENTS

| | | | | |
|---|---|---|---|---|
| 498,212 A * | 5/1893 | Name | .............................. | 112/226 |
| 4,776,827 A * | 10/1988 | Greaves | ......................... | 374/161 |
| 4,789,992 A * | 12/1988 | Wickersheim et al. | ....... | 374/161 |
| 4,895,156 A * | 1/1990 | Schulze | ......................... | 600/342 |
| 5,030,834 A * | 7/1991 | Lindmayer et al. | ......... | 250/484.5 |
| 5,035,513 A * | 7/1991 | Fehrenbach et al. | .......... | 374/161 |
| 5,051,590 A * | 9/1991 | Kern et al. | ............... | 250/339.04 |
| 5,211,480 A * | 5/1993 | Thomas et al. | ................ | 374/161 |
| 5,255,980 A * | 10/1993 | Thomas et al. | ................ | 374/161 |
| 5,351,268 A * | 9/1994 | Jensen et al. | ................... | 374/131 |
| 5,355,423 A * | 10/1994 | Phillips | ............................ | 385/12 |
| 6,045,259 A * | 4/2000 | Djeu | .............................. | 374/161 |
| 6,123,455 A * | 9/2000 | Beshears et al. | .............. | 374/161 |
| 6,571,482 B1 * | 6/2003 | Tymianski | ...................... | 33/265 |
| 2005/0109951 A1 * | 5/2005 | Fish et al. | ................... | 250/461.1 |
| 2007/0228949 A1 | 10/2007 | Maruyama et al. | | |
| 2008/0069180 A1 * | 3/2008 | Djeu | .............................. | 374/161 |
| 2009/0135880 A1 * | 5/2009 | Ichida et al. | ................... | 374/161 |

FOREIGN PATENT DOCUMENTS

| | | | |
|---|---|---|---|
| JP | 02-290518 A | | 11/1990 |
| JP | 04357420 A | * | 12/1992 |
| JP | 2002-71473 A | | 3/2002 |

* cited by examiner

*Primary Examiner* — Gail Verbitsky
(74) *Attorney, Agent, or Firm* — McDermott Will & Emery LLP

(57) ABSTRACT

To provide a temperature sensor probe that can take stable measurements, and a manufacturing method thereof. The temperature sensor probe related to the present invention is a temperature sensor probe for measuring temperature using a fluorescent substance that changes fluorescent characteristics depending on temperature. Then, a powdered fluorescent substance, a guide wave route member that propagates excitation light, which is irradiated on the fluorescent substance, and fluorescent light, which is produced by the fluorescent substance, are provided. Further, the particle size of the powdered fluorescent substance is confined to the range of 60 to 100 μm.

4 Claims, 5 Drawing Sheets

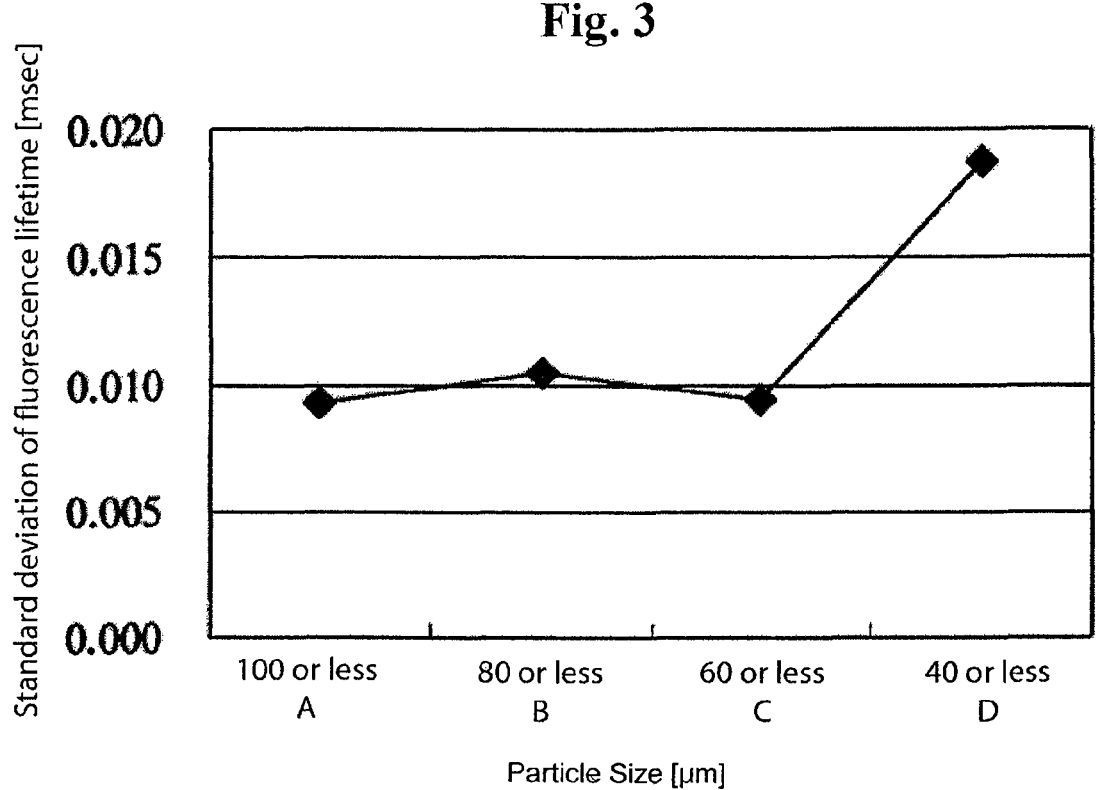
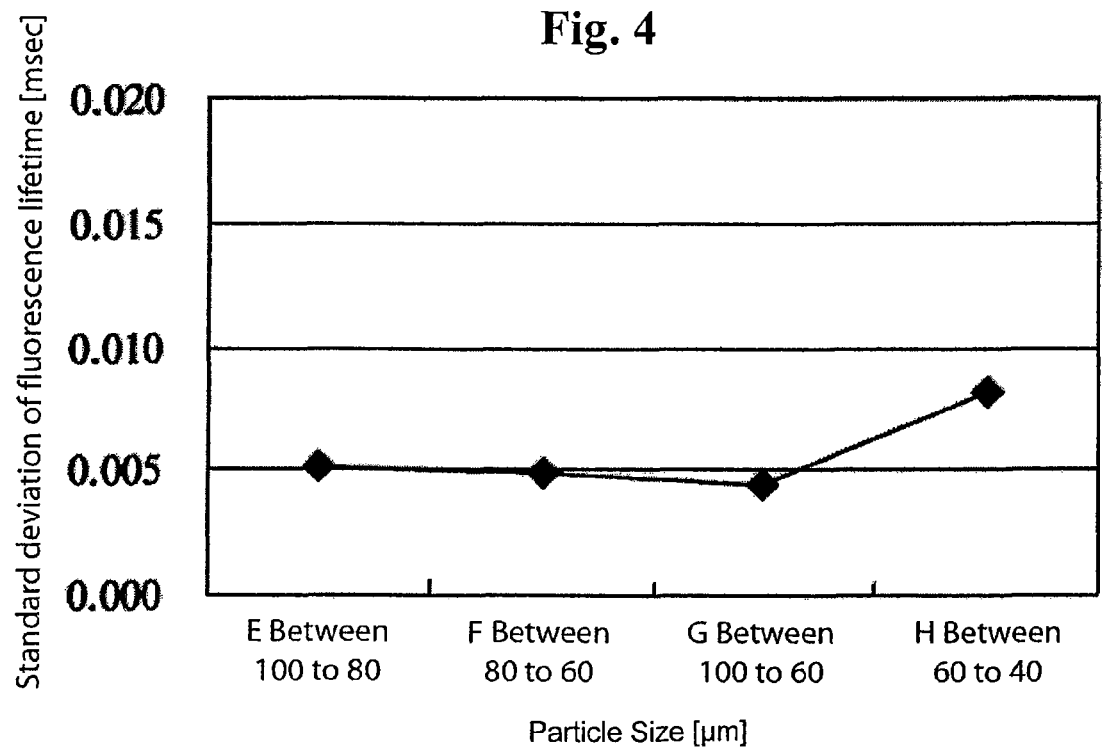

Aggregate of small particles

TEMPERATURE SENSOR PROBE

CROSS-REFERENCE TO RELATED APPLICATION

This application claims the benefit under 35 U.S.C. §119 of Japanese Patent Application No. 2007-302587, filed on Nov. 22, 2007, which is hereby incorporated by reference herein in its entirety.

BACKGROUND OF THE INVENTION

1. Field of the Invention

The present invention relates to a temperature sensor probe, and more specifically relates to a temperature sensor probe that has a powder fluorescent substance.

2. Description of the Related Art

Fluorescent type temperature sensors that use fluorescent substances are widely used as temperature sensors (Japanese Laid-Open Patent Application No. 2002-71473). In a fluorescent type temperature sensor, the temperature is measured using a fluorescent substance that changes fluorescence characteristics depending on temperature. Concretely, excitation light from a light source is irradiated on the fluorescent substance, and the fluorescence produced by the fluorescent is detected. Then, the temperature is measured based on the changes in fluorescence characteristics such as fluorescence lifetime.

A fluorescent material containing a fluorescent substance is arranged at the tip of optical fibers. Then, the excitation light irradiated from a light source falls incident on the fluorescent substance through the optical fibers. Moreover, the fluorescent light generated by the fluorescent substance is detected by an optical sensor through the optical fibers. Powder fluorescent substance may be used in temperature sensor probes using this kind of temperature sensor. Further, it has been disclosed in a patent that the particle size of the powder of the fluorescent substance is 40 µm or less (Japanese Laid-Open Patent Application No. Hei 2-290518).

Nonetheless, in the probe of Japanese Laid-Open Patent Application No. Hei 2-290518 there is the problem that because of the small particle size sufficient intensity of fluorescence cannot be obtained. For example, even if each individual particle is transparent, the fine particles fit together, pile up and form layers. As indicated in FIG. 7, if the particle size of the fluorescent substance is small, the excitation light is randomly reflected in non-specific directions by the particles, and transparency is lost. In FIG. 7, the solid arrows indicate the propagation routes of incident light, and the broken arrows indicate the propagation routes of fluorescent light. The excitation light irradiated out from the optical fibers is reflected near the surface without being delivered deep into the fluorescent substance. Therefore, because the only the surface of fluorescent substance fluoresces, sufficient intensity of fluorescence cannot be obtained. If sufficient intensity of fluorescence cannot be obtained, then the intensity of fluorescence to noise in the detection route is small, and the calculated measurement results ill fluctuate with every reading. Moreover, unless the particle size is regulated, the fluorescence lifetime will fluctuate depending on the internal stress of the powder, and measurements will be different for every powder. In this way, convention temperature sensor probes had the problems of not being able to obtain sufficient intensity of fluorescence and of difficulty in conducting stable measurements.

Attempting to resolve these kinds of problems, an object of the present invention is to present a temperature sensor probe that can conduct stable measurements, and the manufacturing method thereof.

SUMMARY OF THE INVENTION

A first aspect of the present invention is a temperature sensor probe for measuring temperature using a fluorescent substance that changes fluorescence characteristics based on temperature, including: a powder fluorescent substance, and a guide wave route member that propagates excitation light, which irradiates the aforementioned fluorescent substance, and fluorescent light, which is generated by the aforementioned fluorescent substance, wherein the particle size of the aforementioned powder fluorescent substance is in the range of 60 to 100 µm. The intensity of fluorescence can thereby be improved, and therefore stable measurement becomes possible.

In the aforementioned temperature sensor probe, the aforementioned fluorescent substance is preferably a ruby.

In the aforementioned temperature sensor probe, the excitation light irradiated from the aforementioned fluorescent substance is preferably light from a yellow LED. The measurement noise can thereby be reduced.

According to the present invention, a temperature sensor probe that can conduct stable measurements can be provided.

DETAILED BRIEF DESCRIPTION OF THE DRAWINGS

FIG. 1 is a side view cross-sectional diagram indicating the configuration of a temperature sensor related to a first embodiment of the present invention;

FIG. 2 schematically indicates the propagation route of the excitation light in the fluorescent material in a sensor probe related to the present embodiment, and indicates the propagation route of the fluorescent light;

FIG. 3 is a graph indicating the fluctuations in intensity of fluorescence when varying the range of particle sizes;

FIG. 4 is a graph indicating the fluctuations in intensity of fluorescence when varying the range of particle sizes;

DESCRIPTION OF THE PREFERRED EMBODIMENTS

Figure 1:
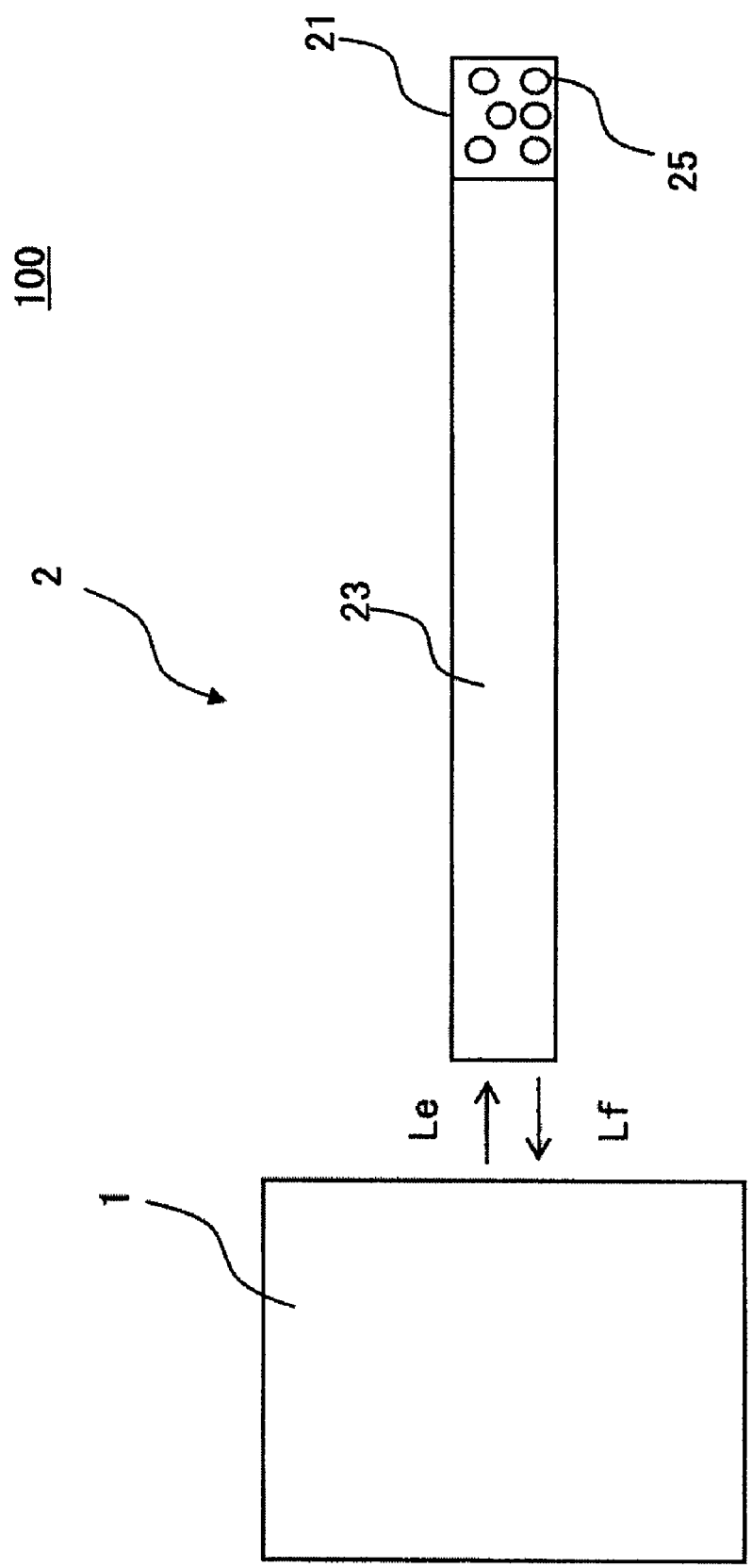

Concrete embodiments applying the present invention will be explained in detail below while referring to the diagrams. FIG. 1 is a side view diagram schematically indicating the configuration of a temperature sensor.

Temperature sensor 100 has a main unit 1 and a sensor probe 2. The temperature sensor 100 is a fluorescent type temperature sensor that measures temperature using a fluorescent substance in which the fluorescence characteristics change depending on temperature. Accordingly, a fluorescent material 21 that contains the fluorescent substance 25 is provided in the sensor probe 2. Then, the sensor probe 2 is installed on the main unit 1 through a connector (not indicated in the diagram), etc. Provided on the main unit 1 are: a light source, which emits the excitation light $L_e$ that is irradiated on the fluorescent material 21; a light detector, which detects the fluorescent light $L_f$ generated by the fluorescent substance contained in the fluorescent material 21; and a half mirror, etc. for separating the excitation light $L_e$ from the fluorescent light $L_f$. Further, the main unit 1 is not limited to the configuration described above. The main unit 1 measures temperature by changes in the fluorescence lifetime when irradiated with pulse light.

Preferably, a yellow LED (light emitting diode) with a wavelength of approximately 600 nm is used for the light source. Here, for example, an easily obtainable LED with a core wavelength of 590 nm is used. By using a yellow LED, excitation light can be stably irradiated on the fluorescent material 21. Moreover, since a yellow LED has a long light source lifetime, the LED can operate for many hours. Further, because yellow light is used as excitation light, measurement noise can be reduced. Specifically, if for example a photodiode made of silicon is used as a light detector, when irradiating with an excitation light having a short wavelength (for example, a wavelength of 405 nm), a current level is formed in the silicon chip. Consequently, dark current increases and noise is exacerbated when used over a long time. On the other hand, this kind of increase in dark current can be reduced by using yellow excitation light. Consequently, noise can be reduced and highly precise measurements can be taken. Further, when used as the fluorescent substance 25, rubies absorb a large amount of the yellow light. Consequently, the intensity of fluorescence can be heightened.

Next, the sensor probe 2 related to the present embodiment will be explained in detail. The sensor probe 2 has fluorescent material 21 and guide wave route rod 23. The fluorescent material 21 is provided on the tip of the guide wave route rod 23.

The guide wave route rod 23 has a long narrow rod shape. The guide wave route rod 23 is of guide wave route material, for example, a quartz rod that propagates light or optical fibers. Further, bundled fibers in which multiple optical fibers are bundled together may be used. Consequently, the guide wave route rod 23 is configured by a transparent material with a high refractive index such as quartz or glass. The fluorescent light $L_f$, which is generated by the excitation light $L_e$ from this main unit 1 and the fluorescent material 21, is propagated by being repeatedly and fully reflected within the guide wave route rod 23. Specifically, the guide wave route rod 23 is a floodlight route for irradiating the fluorescent material 21 with the excitation light $L_e$.

The fluorescent material 21 has a powder fluorescent substance 25. Specifically, the fluorescent material 21 is composed of an aggregate of fluorescent substance powder. Further, a protective tube to protect the guide wave route rod 23 and the fluorescent material 21 may be provided. For example, a powder such as ruby or alexandrite may be used as the fluorescent substance 25. Here, powdered ruby is used as the fluorescent substance 25. Moreover, the fluorescent material 21 that contains the fluorescent substance 25 may be affixed to the tip of the guide wave route rod 23 using a binder or the like.

Figure 2:
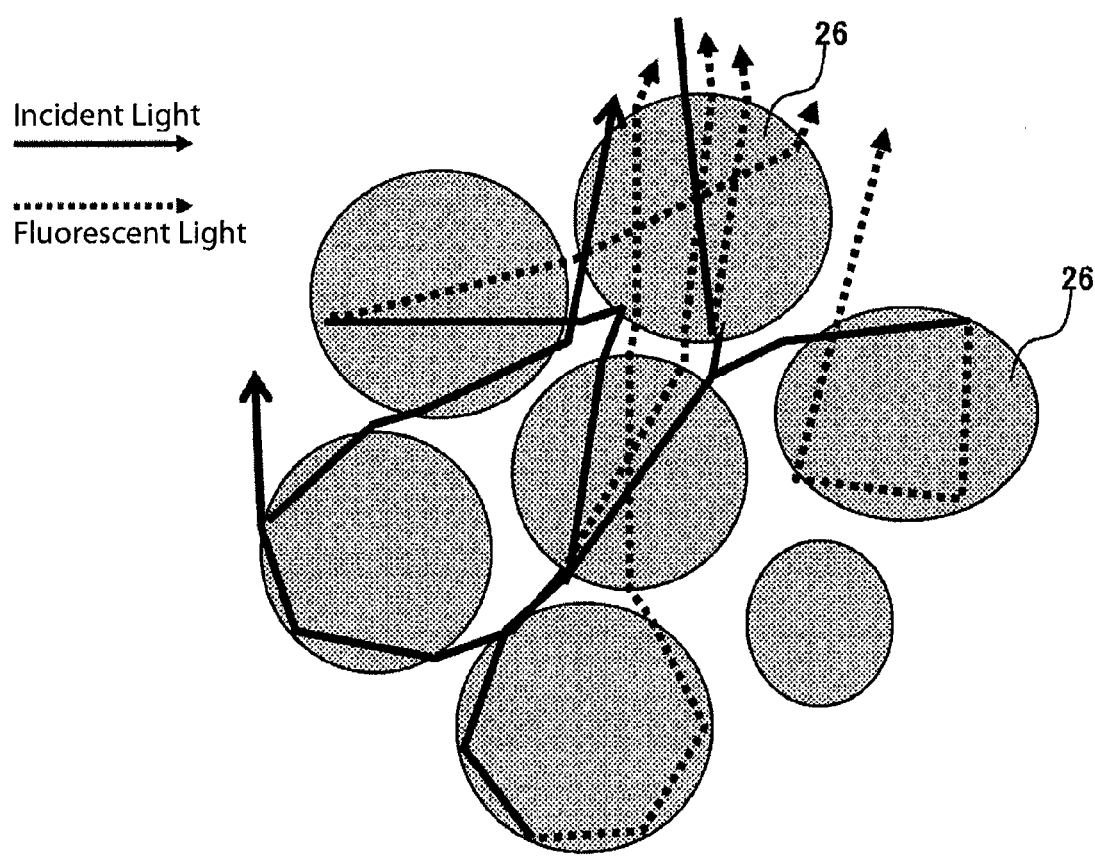

The particle size of the powder fluorescent substance 25 is 60 to 100 μm. Specifically, the particle size of the fluorescent substance 25 contained in the fluorescent material 21 is kept within the range of 60 to 100 μm. The intensity of fluorescence can thereby be heightened, and stable measurements become possible. Specifically, as indicated in FIG. 2, when making the particle size larger than that in conventional technology, gaps are formed between individual particles 26 of the particles of fluorescent substance 25. FIG. 2 indicates an enlargement of the particles of fluorescent substance 25 in the fluorescent material. In FIG. 2, the solid lines indicate the propagation routes of the incident light, and the broken lines indicated the propagation routes of the fluorescent light. Further, in FIG. 2 the individual particles are indicated as spherical, but the actual powder has differing shapes with microcontours. The excitation light is diffused and reflected by Fresnel reflection at the surface boundary of the coating substance and the individual particles 26 of the fluorescent substance. Consequently, the excitation light can proceed deeply into the fluorescent material. The propagation distance of the excitation light into the fluorescent material can be extended, and the fluorescence intensity can be heightened.

By heightening the fluorescence intensity in this way, stable measurement becomes possible. Specifically, the fluorescence intensity in relation to noise can be heightened in the detection circuit that is provided in the main unit 1. Consequently, the signal noise ratio can be improved, and the calculated fluorescence lifetime is not easily affected by noise. Further, by making the particle size uniform in a fixed range, the inner stress of the powder can be made uniform. Because the inner stress of the powder is thereby made uniform, fluctuations of fluorescence lifetime can be reduced. It is thereby possible to make stable measurements. Moreover, the interchangeability of sensor probes can thereby be heightened, and it is no longer necessary to calibrate for every sensor probe. Consequently, the costs of adjusting the temperature sensors can be lowered. Further, the powder use efficiency is heightened because powder in a broad particle size range of 60 to 100 μm can be used.

The method of producing the fluorescent substance 25 will be explained. First, ingots are manufactured using a crystal growth method such as the Verneuil process. A monocrystal or polycrystal ruby crystal ingot is thereby formed. Then, after pulverizing the ruby crystal, the concentration distribution is made uniform by agitating. Dependence on crystal orientation thereby disappears. Next, the ruby powder particle size is made uniform in a fixed range. In this instance, the ruby particles are graded by size. The particle size may be determined by the weight method, mesh method, and laser particularity distribution measurement method. Here, the mesh method is used because the particles are easy to size. For example, each differing particle size can be graded depending on the size of the mesh.

Here, the powder is graded by size using a square mesh. For example, a mesh size of approximately 100 μm×100 μm and a mesh size of approximately 60 μm×60 μm are used. Then, the particle size range can be regulated by passing the pulverized particles through the 2 meshes. For example, powder with a particle size of 60 to 100 82 m can be separated out by passing through the 100-μm mesh followed by passing through the 60-μm mesh. Productivity can be improved by using meshes of different sizes in this way because grading can be simplified. The size of the powder can be made uniform by passing through 2 or more meshes, and the particle size can be confined to a fixed range. The fluorescence characteristics can thereby be stabilized. Further, measurement tests can be conducted by sizing the powder in the same way using a mesh size of approximately 80 μm×80 μm and a mesh size of approximately 40 μm×40 μm.

An example of the measurement results when varying the particle size range of the fluorescent substance 25 will be explained next using FIGS. 3 to 6. Here, the fluorescence lifetime was measured using powdered ruby with a 0.2 mass % (wt %) Cr concentration. Specifically, 0.2 mass % chrome was contained in relation to alumina. Forty samples each of powdered ruby aggregate in fixed ranges of particle sizes were used. Then, all samples were used to measure the measurement target at room temperature, and fluctuations of fluorescence lifetime were investigated. Specifically, the standard deviations of the measured results of the 40 samples were taken as the fluctuations of fluorescence lifetime.

FIGS. 3 and 4 indicate the fluctuations of fluorescence lifetime when varying the particle size range. The fluctuations of fluorescence lifetime in relation to four types of sample particle ranges are indicated in FIGS. 3 and 4. FIG. 3 is the measured results of a group of samples having powdered ruby with particle size ranges descending from the upper limit value, and FIG. 4 is the measured results of a group of samples having powdered ruby with particle size ranges ascending from the lower limit value and descending from the upper limit value. Specifically, the results indicated in FIG. 3 set only the upper limit value of particle size, and the results indicated in FIG. 4 set the upper and lower limit values of particle size.

Let the particle size ranges used in the measured results of FIG. 3 be ranges A to D, and let the particle size ranges used in the measured results of FIG. 4 be ranges E to H. The measurement of range A is the measurement of particle sizes less than 100 µm; the measurement of range B is the measurement of particle sizes less than 80 µm; the measurement of range C is the measurement of particle sizes less than 60 µm; and the measurement of range D is the measurement of particle sizes less than 40 µm. The measurement of range E is the measurement of particle sizes included in the range of 100 to 80 µm; the measurement of range F is the measurement of particle sizes included in the range of 80 to 60 µm; the measurement of range G is the measurement of particle sizes included in the range of 100 to 60 µm; and the measurement of range H is the measurement of particle sizes included in the range of 60 to 40 µm.

Comparing FIG. 3 and FIG. 4 reveals that uniform particle size restricts the fluctuation of fluorescence lifetime. Specifically, not only the upper limit value but also the lower limit value was set, and fluorescence lifetime fluctuations were smaller. For example, it can be seen that the measured value of range G with particles of 100 to 60 µm had a smaller standard deviation than that of range A, in which all of the particles were 100 µm or less. Further, the measurement of range G had smaller fluctuations of fluorescence lifetime than did the measurement of range H. Consequently, when making a particle size of 60 to 40 µm, even with the uniformity of particle size, the gaps between particle and particle become small. For that reason, the propagation distance of the excitation light becomes short and fluctuations of fluorescence lifetime are heightened. Further, range G is a broader particle size range than ranges E and F, but the fluctuations of fluorescence lifetime are slightly smaller. Fluctuations of fluorescence lifetime can be suppressed in this way by making uniform particles of 60 µm or more and 100 µm or less.

Figure 5:
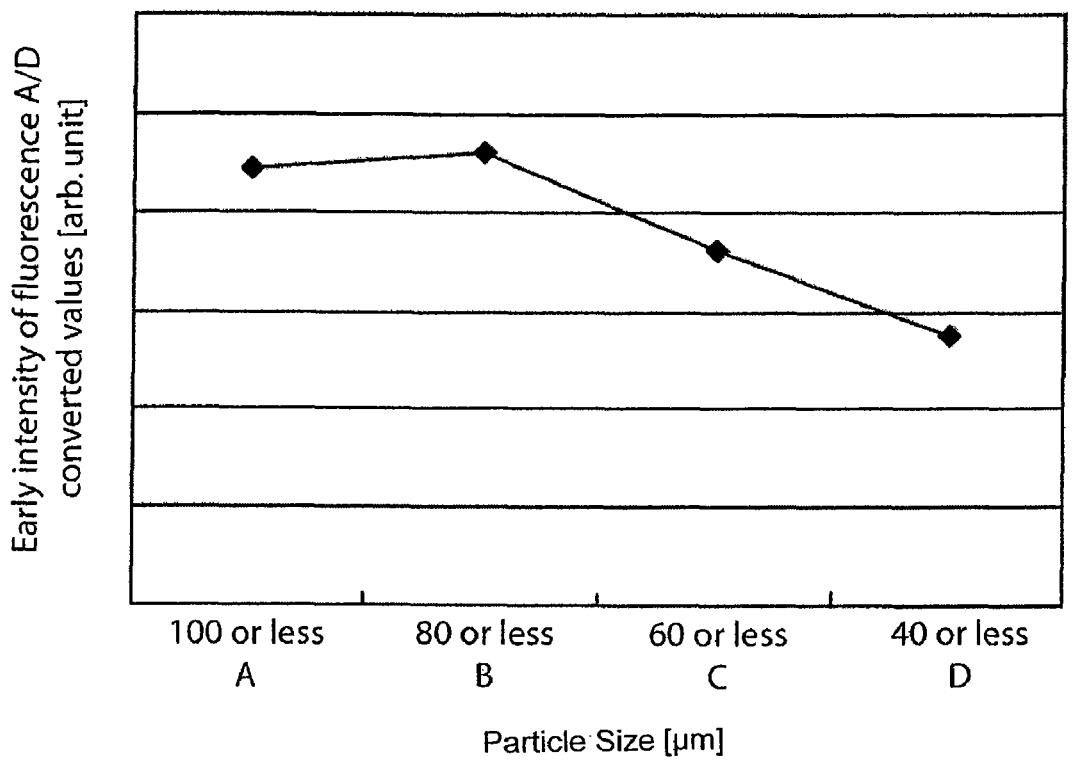
FIG. 5 is a graph indicating the intensity of fluorescence when varying the range of particle sizes.
Figure 6:
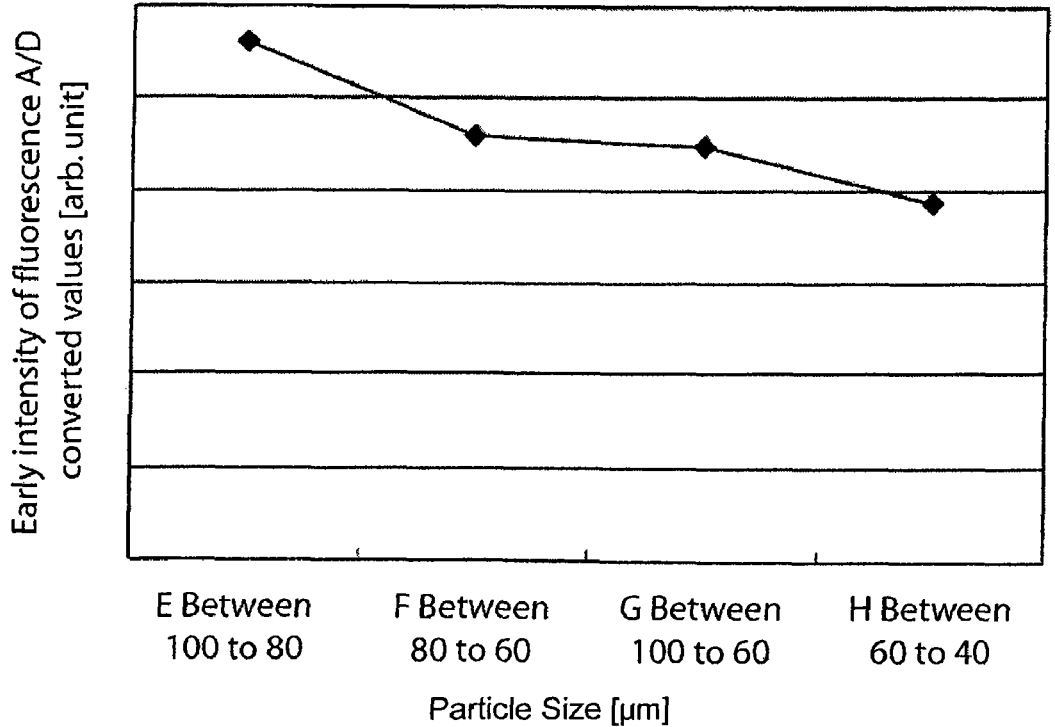
FIG. 6 is a graph indicating the intensity of fluorescence when varying the range of particle sizes.
Figure 7:
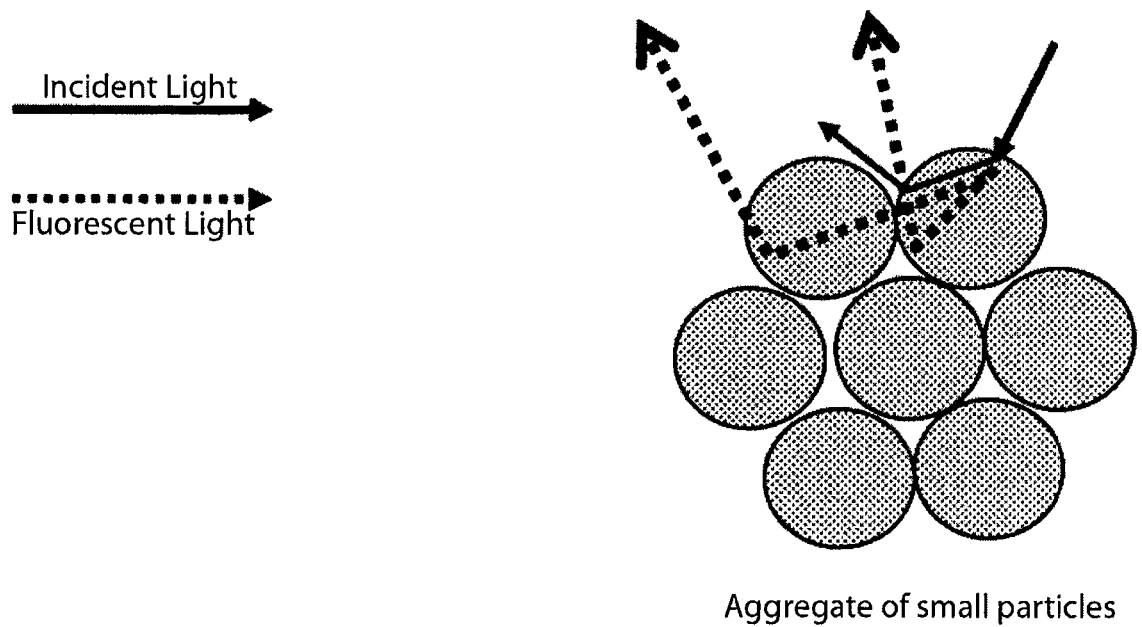
FIG. 7 schematically indicates the propagation route of the excitation light in the fluorescent material in a conventional sensor probe, and indicates the propagation route of the fluorescent light.

Next, the intensity of fluorescence when measuring ranges A to H will be explained using FIGS. 5 and 6. FIG. 5 is a graph indicating the results of measuring ranges A to D, and FIG. 6 is a graph indicating the results of measuring ranges E to H. The ordinate indicates the average value of the A/D converted values of the initial intensity of fluorescence. Consequently, the ordinate indicates the average value of the intensity of fluorescence in the 40 samples. In addition, the ordinate indicates the mean value of the intensity of fluorescence in the 40 samples. Moreover, the scales of the ordinate are equivalent in FIGS. 5 and 6.

It can be seen that the larger the particle size, the higher the intensity of fluorescence. Specifically, the excitation light proceeds deeper because the gaps between adjacent particles are wider. Consequently, the propagation distance of the excitation light can become longer, and the intensity of fluorescence can be made higher. Moreover, it can be understood the intensity of fluorescence in the measurements of range G is higher than in the measurements of range C. The intensity of fluorescence becomes higher by making the particle size uniform in this way. Further, range G is a broader particle size range than range F, but the intensity of fluorescence is nearly the same. Consequently, the efficiency of use of the powder fluorescent substance can be improved, and the productivity can be improved.

As indicated above, the particle sizes of the fluorescent substance included in the fluorescent material 21 are in the range of 100 to 60 µm. Gaps between the particles 26 of fluorescent substance 25 can thereby be made, and the propagation distance of the excitation light becomes longer. Consequently, the excitation light proceeds more deeply into the fluorescent material 21. The intensity of fluorescence can thereby become higher and stable measurements become possible. Stable measurements become possible by using an aggregate of fluorescent particles with a particle size of 60 to 100 µm. The amount of Cr added to alumina may be other than 0.2 mass % (wt %). The present invention is not limited to powdered ruby fluorescent substance, and powdered alexandrite fluorescent substance may also be used.

Moreover, the wavelength of the excitation light may be varied from yellow (central wavelength 590 nm). For example, if the wavelength is smaller, the refractive index is greater and the light bends well, but the aforementioned range of particle sizes hardly changes. Measurements can thereby be stabilized even if there are differences in the wavelengths of the excitation light.

The invention claimed is:

1. A temperature sensor probe for measuring temperature using a fluorescent substance that changes fluorescence characteristics based on temperature, comprising:
   a powder fluorescent substance, and
   a guide wave route member that propagates excitation light, which irradiates said fluorescent substance, and fluorescent light, which is generated by said fluorescent substance, wherein the particle size of said powder fluorescent substance is in the range of 60 to 100 µm,
   wherein characteristics change in the fluorescent substance that are indicative of the measured temperature,
   wherein the excitation light irradiated on said fluorescent substance is light from a yellow LED.

2. The temperature sensor probe according to claim 1, wherein said fluorescent substance is a ruby.

3. The temperature sensor probe according to claim 1, wherein the excitation light irradiated on said fluorescent substance comprises a wavelength of approximately 600 nm.

4. The temperature sensor probe according to claim 1, wherein the excitation light irradiated on said fluorescent substance comprises a core wavelength of 590 nm.

* * * * *